United States Patent
Lee et al.

(10) Patent No.: US 6,915,325 B1
(45) Date of Patent: Jul. 5, 2005

(54) METHOD AND PROGRAM CODE FOR COMMUNICATING WITH A MOBILE NODE THROUGH TUNNELS

(75) Inventors: Cheng-Yin Lee, Ottawa (CA); Fayaz Kadri, Kanata (CA); Glenn Morrow, Plano, TX (US)

(73) Assignee: Nortel Networks Ltd (CA)

( * ) Notice: Subject to any disclaimer, the term of this patent is extended or adjusted under 35 U.S.C. 154(b) by 865 days.

(21) Appl. No.: 09/753,069

(22) Filed: Jan. 2, 2001

Related U.S. Application Data

(60) Provisional application No. 60/188,811, filed on Mar. 13, 2000.

(51) Int. Cl.$^7$ .............................................. G06F 15/16
(52) U.S. Cl. ....................... 709/202; 455/433; 455/435; 455/456
(58) Field of Search ................................ 709/202, 234, 709/241, 245; 455/433, 435, 456; 370/313, 356, 409, 466

(56) References Cited

U.S. PATENT DOCUMENTS

| | | | | |
|---|---|---|---|---|
| 6,144,671 A | * | 11/2000 | Perinpanathan et al. | 370/409 |
| 6,567,664 B1 | * | 5/2003 | Bergenwall et al. | 455/403 |
| 6,578,085 B1 | * | 6/2003 | Khalil et al. | 709/241 |
| 6,584,098 B1 | * | 6/2003 | Dutnall | 370/354 |
| 6,621,810 B1 | * | 9/2003 | Leung | 370/338 |
| 6,625,135 B1 | * | 9/2003 | Johnson et al. | 370/332 |
| 6,738,362 B1 | * | 5/2004 | Xu et al. | 370/329 |

OTHER PUBLICATIONS

Katz, *Standards Track*, Cicso Systems, http://www.ietf.org/rfc2113.txt?number+211, Feb. 1997.

Perkins et al., *Route Optimization in Mobile IP*, Internet Draft, Feb. 15, 2000.

* cited by examiner

*Primary Examiner*—John Follansbee
*Assistant Examiner*—Jinsong Hu
(74) *Attorney, Agent, or Firm*—Steubing McGuinness & Manaras LLP

(57) ABSTRACT

Location update messages for a mobile node can be made interceptible by routers which form tunnels for communication with the mobile node. A correspondent agent intercepts a Binding Update with a Router Alert and binds the address of the mobile node with a care of address for the mobile node provided in the Binding Update. The correspondent agent will thereafter intercept messages from its correspondent host destined for the mobile node and redirect them to the care of address thereby bypassing the home agent of the mobile node. A border router intercepts a Registration Request with Router Alert and binds the address of the mobile node with a care of address for the mobile node. If a binding existed previously, then the border router terminates the Request. Otherwise, the Request is forwarded to the home agent of the mobile node after substituting its own address for the care of address.

18 Claims, 6 Drawing Sheets

METHOD AND PROGRAM CODE FOR COMMUNICATING WITH A MOBILE NODE THROUGH TUNNELS

PRIORITY

This application claims priority from U.S. Provisional Application 60/188,811, filed Mar. 13, 2000, the full disclosure of which is hereby incorporated by reference herein.

FIELD OF THE INVENTION

The present patent generally relates to networks and, more particularly, to efficiently permitting communication with a mobile node across various domains.

BACKGROUND OF THE INVENTION

A mobile node (MN) is typically a host identified by its home IP address. When it moves to a new location, it has to notify its home agent. The home agent is a router located in the home subnet of the mobile node. The notification enables the home agent to route EP datagrams to the mobile node at its new location. The mobile node notifies its home agent of its new care of address by sending a Registration Request message. This registration mechanism is defined in the base Mobile IP protocol (MIP).

The base Mobile IP allows a correspondent host to transparently send datagrams to mobile nodes as it would to any other nodes. Datagrams addressed to the mobile node are always routed via the home agent in the home network. The mobile node keeps the home agent informed of its whereabouts. As the mobile node moves away from its home network, it may no longer be topologically close to its home agent. Route optimization [MIP-OPTIM] has been proposed to allow a host to send packets to the mobile node as the mobile node (MN) moves, without having to route the packets via the home agent each time. The mobile node provides its current address to a host (or correspondent node, CN) with which it is communicating as it moves. In MIP-OPTIM, a mobile node may notify the correspondent nodes of its care of address via the home agent.

As described in MIP-OPTIM, a mobile node may send a Binding Warning message to its home agent to request that the home agent inform (by sending Binding Update messages) the correspondent hosts of its new care-of address (COA). A mobile node may append this message (Binding Warning Extension) in the Registration Request message to the home agent. On reception of the Binding Warning Extension message, the home agent should send Binding Update messages to the correspondent hosts listed in the Binding Warning message, to notify the correspondent hosts of the mobile node's new care of address.

The correspondent host updates a cache of mobile node locations with this new address and tunnels datagrams (addressed to the mobile network device) to the current address of the mobile network device. However, not all existing host systems support tunneling. Thus, not all correspondent hosts are capable of tunneling IP datagrams as required by the route optimization mechanisms described in [MIP-OPTIM]. More importantly, disclosing the current location (or "care of address" (COA)) of the mobile node to correspondent hosts is not always desirable for security reasons. Nor is the overhead for the correspondent hosts of encapsulating datagrams to the mobile node ideal.

SUMMARY OF THE INVENTION

In accordance with embodiments of the invention, communication access to a mobile node is maintained by intercepting, at a router, a location update message. The term "intercept" as used herein means to read a message addressed to another entity. The router binds an address of the mobile node with a care of address received in the location update message. When conducted at a correspondent agent, the act of binding forms a tunnel for messages to the mobile node. For a border router, binding can be a part of forming a tunnel or updating the mobile node's whereabouts for an existing tunnel.

In accordance with further embodiments of the invention, a method and program code set up communications between a mobile node having an associated home agent and a correspondent host. A location update message relating to the mobile node is intercepted at a router. Responsive to the location update message, a tunnel is formed that avoids the home agent. In one embodiment, the tunnel is formed by binding an address for the mobile node with a care of address received in the location update message. In another embodiment, the tunnel is formed by substituting an address of the router for the care of address in the location update message and forwarding the location update message to the home agent. Once the tunnel is set up, messages directed toward the mobile node may be tunneled without passing through the home agent.

In accordance with a still further embodiment of the invention, a location update message is intercepted by a correspondent router. A determination is made as to which router is the redirector between the correspondent host and a care of address received in the location update message. A tunnel is formed for communicating with the mobile node from the redirector router. The correspondent host is commanded to send any messages meant for the mobile node through the redirector router. Such messages are intercepted at the redirector router and transmitted toward the mobile node via the tunnel.

In accordance with a still further embodiment of the invention, a border router having a binding for the mobile node intercepts a location update message from the mobile node. The binding is revised to include a care of address from the location update message. The location update message may be terminated.

With respect to a mobile node, according to an embodiment of the invention, when it changes location, a location update message with a Router Alert is sent. The Router Alert enables a suitably programmed router to intercept the location update message and form a tunnel.

Numerous possibilities derive from embodiments of the invention. By forming a tunnel at a correspondent agent, the current location of the mobile node can be kept secret from the correspondent host. Tunnels may be created by border routers in response to location updates from a mobile node while the mobile node need not be aware of the tunnels. Furthermore, location updates intercepted at border routers having an existing tunnel, can be used to update the tunnel locally at the border router without needing to clutter the network by transmitting the update further. Also, the methods and program code of embodiments of the present invention can be added to any portion of an existing mobile network without requiring updates of all routers in the network.

Other objects and advantages of the invention will become apparent during the following description of the presently preferred embodiment of the invention taken in conjunction with the drawings.

DESCRIPTION OF ILLUSTRATIVE EMBODIMENTS

Figure 1:
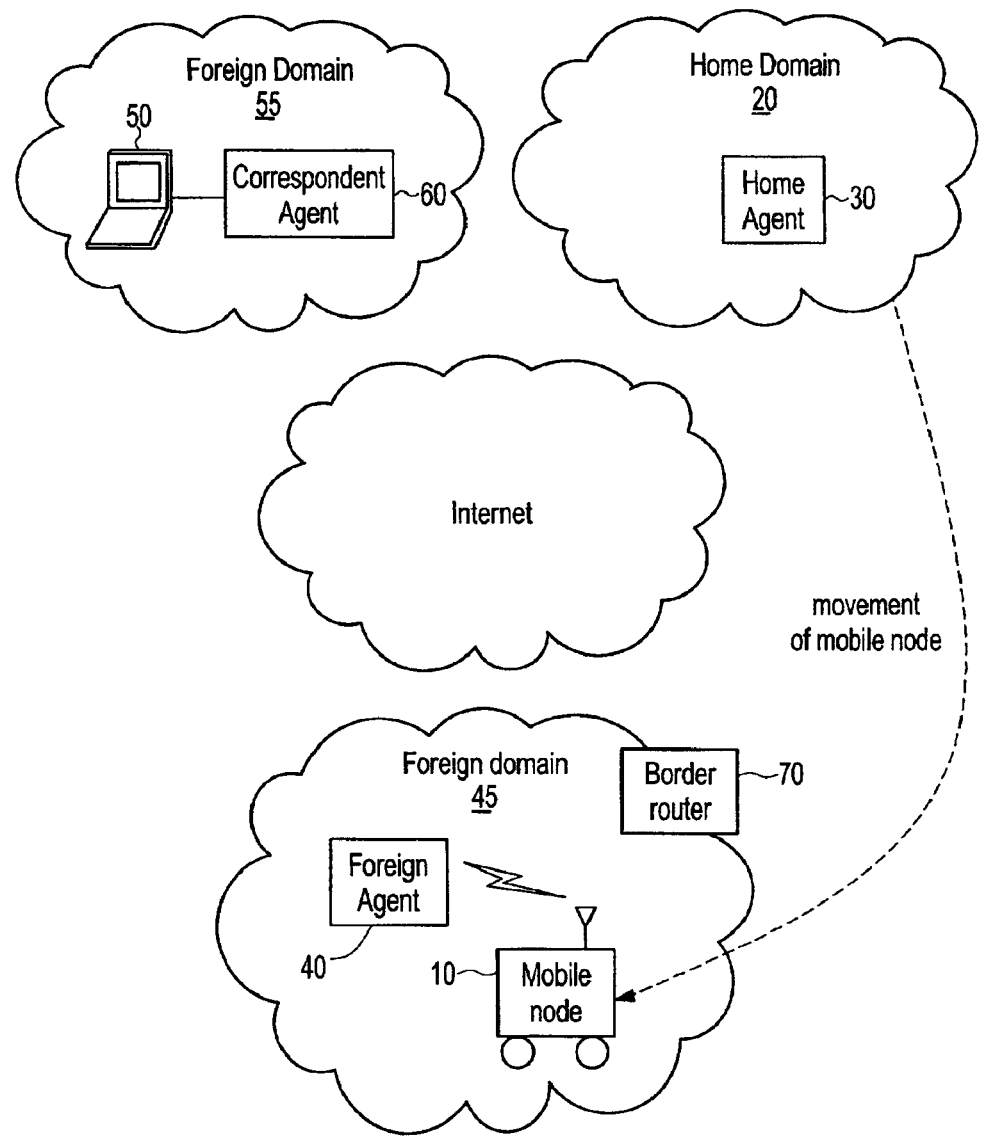
FIG. 1 is a schematic diagram of a network having a mobile node.

Referring now to FIG. 1, a network is illustrated in which a mobile node 10 has moved away from its home domain 20. At the home domain 20, the mobile node was associated with a home agent 30. While in the vicinity of the home agent 30, communications with the mobile node 10 took place through the home agent 30 to the mobile node 10. The home agent 30 is typically a router. A presently preferred mobile node 10 is a mobile IP host. The mobile node 10 acquires a care of address (COA) while it is in the foreign domain. Typically, the mobile node 10 will identify a router to serve as a foreign agent 40 in the foreign domain. The COA may be the foreign agent's 40 IP address. In such case, communications with mobile node 10 pass through the foreign agent 40. In this manner, the foreign agent 40, which is typically a router, can act as a firewall. Alternatively, the mobile node 10 may acquire its own IP address while in a foreign domain and the COA thus addresses the mobile node directly.

FIG. 1 further illustrates a correspondent host 50. The correspondent host 50 may be any of a multitude of hosts with access to the network and which is in communication with the mobile node 10. Using conventional mobile IP (MIP), the correspondent host 50 communicates with the mobile node 10 through the home agent 30. Alternatively, if the correspondent host 50 has been informed of the location of the mobile node and is capable of tunneling, it could communicate directly with the mobile node 10 by encapsulating datagrams. The correspondent agent 60 is a router or routers through which the correspondent host 50 communicates to other nodes that are on the network. In accordance with embodiments of the invention, the correspondent host 50 may be a mobile node, as well.

FIG. 1 further illustrates a border router 70. Border routers 70 generally refer to those routers at a boundary of a domain (also referred to as a network). Border routers 70 interface with or are connected to neighboring domains (or external networks).

Figure 2:
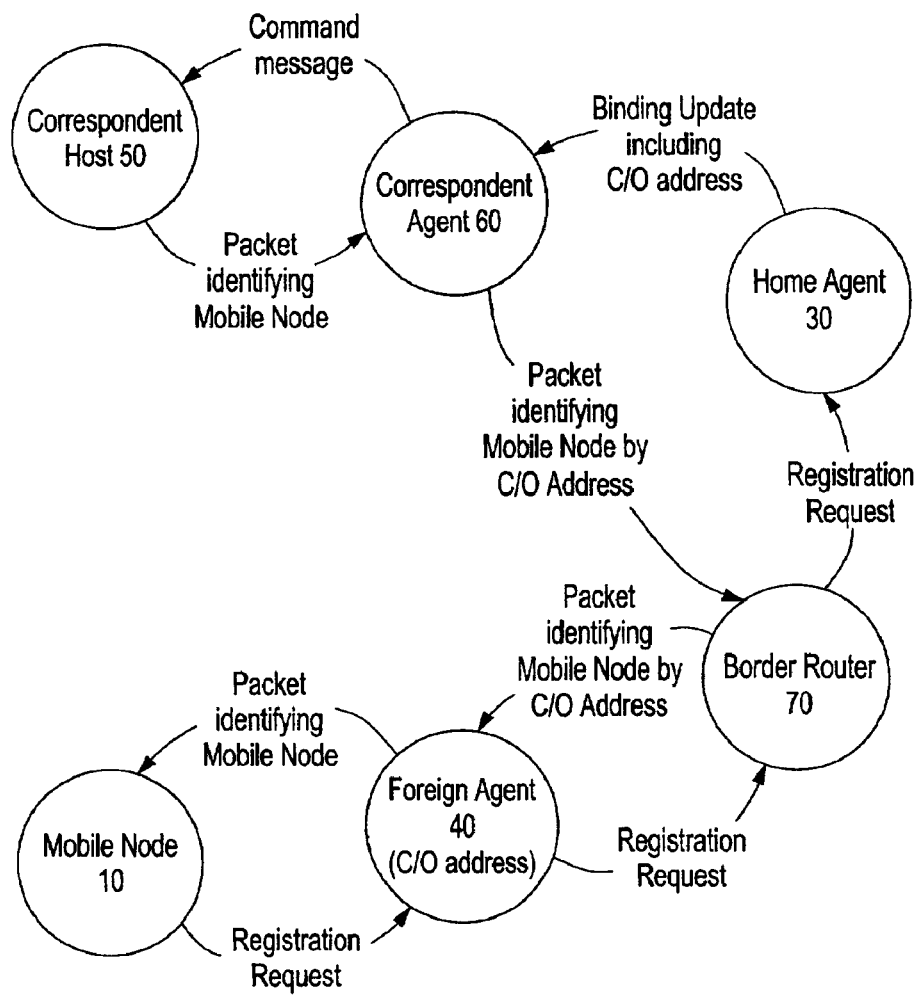
FIG. 2 is a flow diagram of commands forming a tunnel.

Referring now to FIG. 2, embodiments of the invention shall be described for optimizing the use of tunneling for communication with a mobile node. Tunnels may be formed that avoid the home agent for more directly communicating with the mobile node 10. A Binding Update is a known MIP location update message sent from the home agent 30 informing a correspondent host 50 of the care of address for the mobile node 10. In accordance with an embodiment of the invention, the home agent 30 is programmed so as to issue a Binding Update along with a Router Alert. The Router Alert is a known field on a location update message which alerts suitably programmed routers to review the message rather than forwarding it routinely to its next destination. The Router Alert Option is described in Network Working Group RFC 2113 authored by D. Katz, entitled "IP Router Alert Option," dated February 1997 and hereby incorporated by reference herein in its entirety. The Router Alert allows an IP packet to be inspected by routers for further processing if necessary. By programming a correspondent agent 60 to recognize a Binding Update when a Router Alert is included, the correspondent agent 60 will intercept the Binding Update with Router Alert and take steps to form a tunnel to the mobile node. The correspondent agent 60 terminates the Binding Update and does not forward it to the correspondent host 50 to which it was addressed. To form a tunnel, the correspondent agent binds the mobile node address with the care of address received in the location update message. With the tunnel in place, messages from the correspondent host 50 meant for the mobile node 10 are identified by the correspondent agent 60 and redirected by the correspondent agent 60 to the care of address. Thus, the message travels through the tunnel rather than the home agent 30. The correspondent host 50 and its correspondent agent 60 work together in this fashion and therefore are referred to collectively herein as a "correspondent node." A "correspondent node" may alternatively refer to a correspondent host 50 apart from any correspondent agent.

As the mobile node 10 moves from one location to another, it sends a Registration Request to its home agent 30 to inform it of its new care of address. This is a conventional MIP location update message. The Registration Request may further include a Binding Warning extension message informing the home agent of a number of correspondent hosts 50 to which the mobile node 10 requests the home agent 30 to send Binding Update messages. In accordance with an embodiment of the current invention, the Registration Request, with or without the Binding Warning messages, may be sent from the mobile node with a Router Alert. In accordance with a presently preferred embodiment of the invention, an Edge Router Alert should be added to the protocol and be used instead of the conventional Router Alert. An Edge Router Alert is specifically targeted to border routers 70 so that only border routers 70 are alerted to intercept the message. Registration Request messages from the mobile node 10 travel through the foreign domain toward the home agent 30. Typically, the message will first pass through the foreign agent 40 and will eventually reach a router on the edge of the foreign domain. Such routers are referred to as border routers 70. A border router 70 which is suitably programmed to handle such a message with a Router Alert or Edge Router Alert will intercept the message and identify it. The border router 70 will bind the mobile node address with the care of address. This sets up the border router 70 to intercept datagrams bound for the mobile node 10 and send them to the correct care of address. If a binding did not already exist for the mobile node 10, in response to the Registration Request with either type of Router Alert, the border router 70 further substitutes its own address for the care of address provided by the mobile node 10 in its Registration Request message. The Registration Request message is then forwarded to the home agent 30. In this manner, a tunnel end point is set up at the border router 70 proximate the mobile node. Messages meant for the mobile node 10 will be sent to the border router 70. A Binding Update with Router Alert from the home agent to the correspondent host 50 will set up a tunnel at a correspondent agent 60. The tunnel will extend from the correspondent agent 60 to the border router 70 and will avoid the home agent 30.

By intercepting Registration Requests at a border router 70, it is possible to provide an enormous reduction in location update message traffic from the mobile node 10. As the mobile node 10 moves within the foreign domain 45 and changes its care of address, it will send Registration Requests towards the home agent 30. When such messages are intercepted by the border router 70 that already has a binding between the mobile node address and its care of address, the border router 70 only need update the care of address with the new care of address from the Registration Request message. The Registration Request message can then be terminated. The home agent does not need this update since it already has received the address for the border router 70 as the care of address for the mobile node 10. Therefore a tunnel between correspondent agent 60 and border router 70 can remain intact as the mobile node 10 moves around the foreign domain 45. Only when the mobile node 10 gets to some location where its Registration Request messages are directed through a different border router in the foreign or in another foreign domain will there be a need to forward Registration Requests to the home agent 30. Due to such movement, a binding in a border router 70 may go unused when the mobile node 10 has left and gone to a different domain. If a binding remains unused for more than a fixed predetermined time period, it will be discarded.

When the home agent 30 has received a Registration Request with a Binding Warning requesting the home agent 30 to send Binding Updates to specified correspondent hosts 50, the Binding Updates sent from the home agent 30 may be sent with a Router Alert Option so that such Binding Updates can be intercepted by a correspondent agent 60. Correspondent agent 60 is a term used broadly herein to include the last hop router through which the Binding Update is intercepted and provided to the correspondent host 50 and may also include a router 68 that will serve as a redirector through which messages pass when sent from the correspondent host 50 to the mobile node 10. Upon intercepting a Binding Update at the correspondent agent 60, the correspondent agent 60 binds the care of address received in the Binding Update message with the address for the mobile node 10. The Binding Update is terminated. The correspondent agent 60 then sends a message to the correspondent host 50 commanding it to send any message meant for the mobile node 10 through itself, the correspondent agent 60. Thereafter, any such data messages sent from the correspondent host 50 meant for the mobile node 10 will be intercepted by the correspondent agent 60 and redirected to the appropriate care of address. The message travels via a tunnel to the border router 70 or to a selected care of address for the mobile node 10 depending on whether the Registration Request which initiated the Binding Update was intercepted previously by a border router 70.

Figure 3:
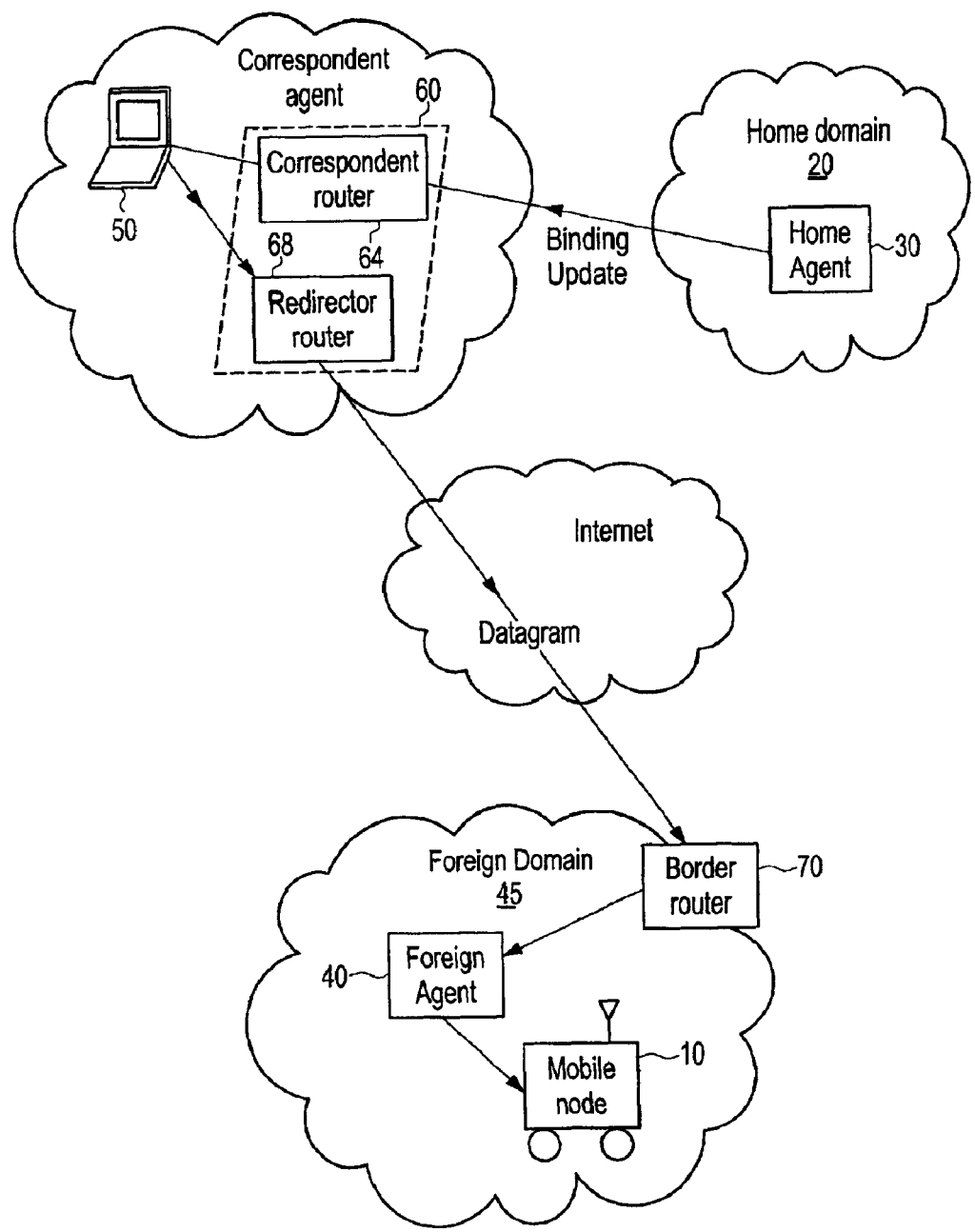
FIG. 3 is a schematic diagram of a network having a mobile node and separately showing two routers functioning as the correspondent agent.

Accommodation should preferably be made for when the last hop router 64 that intercepts the Binding Update is not the router 68 through which messages are normally sent towards where the mobile node 10 is now located, as shown in FIG. 3. Since data messages to the mobile node 10 will go through a tunnel and not back to the home agent 30, there may be a gateway router 68 different from and more efficiently located than the last hop interceptor router 64. Therefore, in accordance with an embodiment of the invention, as described below with respect to FIG. 3, a tunnel may be formed by making router 68 the redirector router. In such a case, the term "correspondent agent" 60 refers to both the redirector router 68 and the last hop interceptor router 64.

Figure 4:
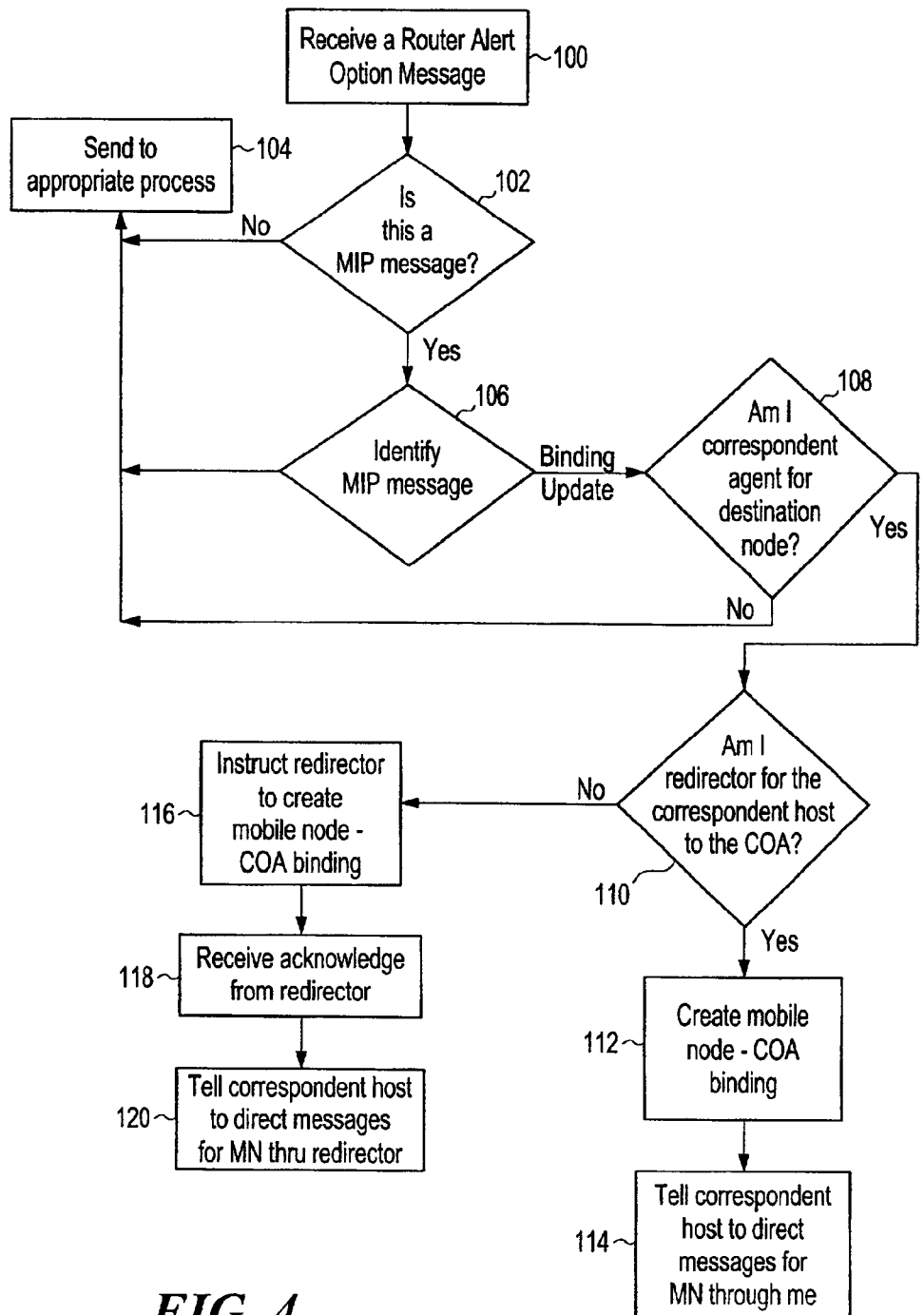
FIG. 4 is a flow chart for handling a Binding Update with Router Alert at a correspondent agent.

Referring now to FIG. 4, a flow chart for handling Router Alert location update messages at correspondent agents 60 is shown. A suitably programmed router 64 will intercept messages which contain a Router Alert Option. Typically, hardware in the router recognizes the Router Alert Option in a received message 100 and pulls the message for review. We describe in FIG. 4 a method for handling a Binding Update with Router Alert. If this is not a mobile IP message 102, it is sent to an appropriate process for handling 104. The message may be intercepted if understood or if not, it will simply be passed along toward its destination address. Mobile IP location update messages may be handled in accordance with embodiments of the present invention. The message is identified 106. For a Binding Update message, if the router intercepting the Binding Update with a Router Alert is a correspondent router 64, i.e., if it is the last hop router, for the destination node of the message, it will proceed to intercept the message 108. Otherwise, the message is simply passed along through an appropriate process 104. The correspondent router 64 handling the Binding Update determines whether it is to be the redirector for the correspondent host 50 when sending messages to the care of address 110. If it is, the correspondent router 64 creates a mobile node to care of address binding 112. Once a tunnel has been formed, messages meant for the mobile node 10 are sent through a tunnel to the care of address rather than through the home agent 30. The correspondent agent 60 informs the correspondent host 50 with an ICMP redirect message that it is to direct any messages meant for the mobile node 10 through the correspondent agent 60. The redirect message should cause the correspondent host IP stack to add or update a route towards the mobile IP home address with the next hop set to the correspondent agent 60. This ensures that the correspondent host IP stack forwards datagrams addressed to the mobile node, to the correspondent agent 60 instead of another router. The Binding Update message can then be terminated. A correspondent host 50 sends data to a mobile node 10 transparently using its home address and need not be aware of the mobile node's address in a foreign network. The correspondent host does not need to be able to encapsulate or decapsulate IP datagrams.

The router intercepting the Binding Update is the last hop router 64 for the correspondent host 50. If the last hop router 64 is not the redirector router 68 for messages from the correspondent host 50 to the care of address, the redirector router 68 in the domain of the correspondent host 50 and last hop router 64 is identified. The last hop router 64 instructs the redirector router 68 to create a mobile node to care of address binding 116. An acknowledgement of the creation of the binding is received 118 from the redirector router 68. Then the last hop router 64 commands 120 the correspondent host 50 to direct any messages meant for the mobile node 10 through the redirector router 68. This is an ICMP redirect message in MIP. In this manner, a location update message, specifically a Binding Update with a Router Alert forms a tunnel.

A Binding Update is sent from a home agent in response to a Registration Request with a Binding Warning from the mobile node. According to another scenario for Binding Updates, a correspondent host 50 may send data to a mobile node 10 transparently, setting its IP destination address to the mobile node home address. The initial data will reach the home agent 30. If the mobile node 10 is not in its home network, this triggers a Binding Update message from the home agent 30 to notify the correspondent host 50 of the mobile node's 10 current location. As described above, the Binding Update message when sent with the Router Alert is intercepted by the correspondent agent 60, which binds the mobile node's home address to the care of address.

Tunneling of datagrams by a correspondent agent 60 can be handled in a number of ways. The correspondent agent 60 can tunnel the data to the mobile node's care-of address by: (a) encapsulating the data in another header e.g. IP—IP, GRE. The IP source address of the outer header is set to the correspondent agent 60 and the IP destination address is set to the care-of address. Data is decapsulated at the care-of address, i.e. at the foreign agent which forwards the data to the mobile node); or (b) changing the IP destination address from the mobile node's home address to the care-of address at the correspondent agent 60; and restoring the IP destination address to the mobile node's home address at the foreign agent 40. This does not require data to be encapsulated and is referred to as "zero byte overhead tunneling". Zero byte overhead tunneling is described in commonly assigned copending application entitled "Method and Apparatus for Data Transmission in a Wireless Network, Ser. No. 09/602,270, filed Jun. 23, 2000, the full disclosure of which is hereby incorporated by reference herein.

"Zero byte overhead tunneling" is most appropriately and naturally used at firewalls, e.g. the correspondent agent 60 could be a firewall to the correspondent host's provider network; and the foreign agent 40 could be a firewall to the foreign network. When a correspondent agent 60 receives a Binding Update, it sets up a "filter" that is defined to match the mobile node home address and translates the IP destination address to the care-of address. When the correspondent agent 60 receives data addressed to the mobile node 10, existing firewall functions will match and translate the data according to the specified "filter." Similarly when a foreign agent 40 receives a Registration Request message, it configures a filter such that the firewall can match and restore a packet (addressed to the mobile node's care-of address) back to the mobile node's home address.

In encapsulation, a care of address may be used by several mobile nodes in the network served by the foreign agent 40. The foreign agent 40 decapsulates the packet and sends the data to the mobile node's home address specified in the inner header IP destination address. This reduces the number of care of addresses that must be provided by a foreign network. In zero byte overhead tunneling, since the mobile node's home address is not provided in the EP header, the care-of address used must be uniquely mapped to the mobile node in the foreign network, i.e. a co-located care of address (CCOA) must be used. Otherwise, the foreign agent 40 is not able to restore the COA back to the mobile node's home address. Alternatively, a scheme which can map the mobile node's home address to a COA and a unique port may be used. In this case, the location update messages and mobility bindings have to be modified to accommodate the port number in addition to the COA. Again, the original IP address and port number are restored at the edge of the network.

Another variation of tunneling data is to encapsulate data to the border router 70 and use "zero byte overhead tunneling" to the mobile node 10. This may be useful where firewall functions are not available at the correspondent host's network 55. Further, if the CCOA used are private addresses within the foreign domain 45, this variation allows data to be encapsulated to the public COA at the border router 70 and "zero byte overhead tunneled" to the private CCOA of the mobile node.

Figure 5:
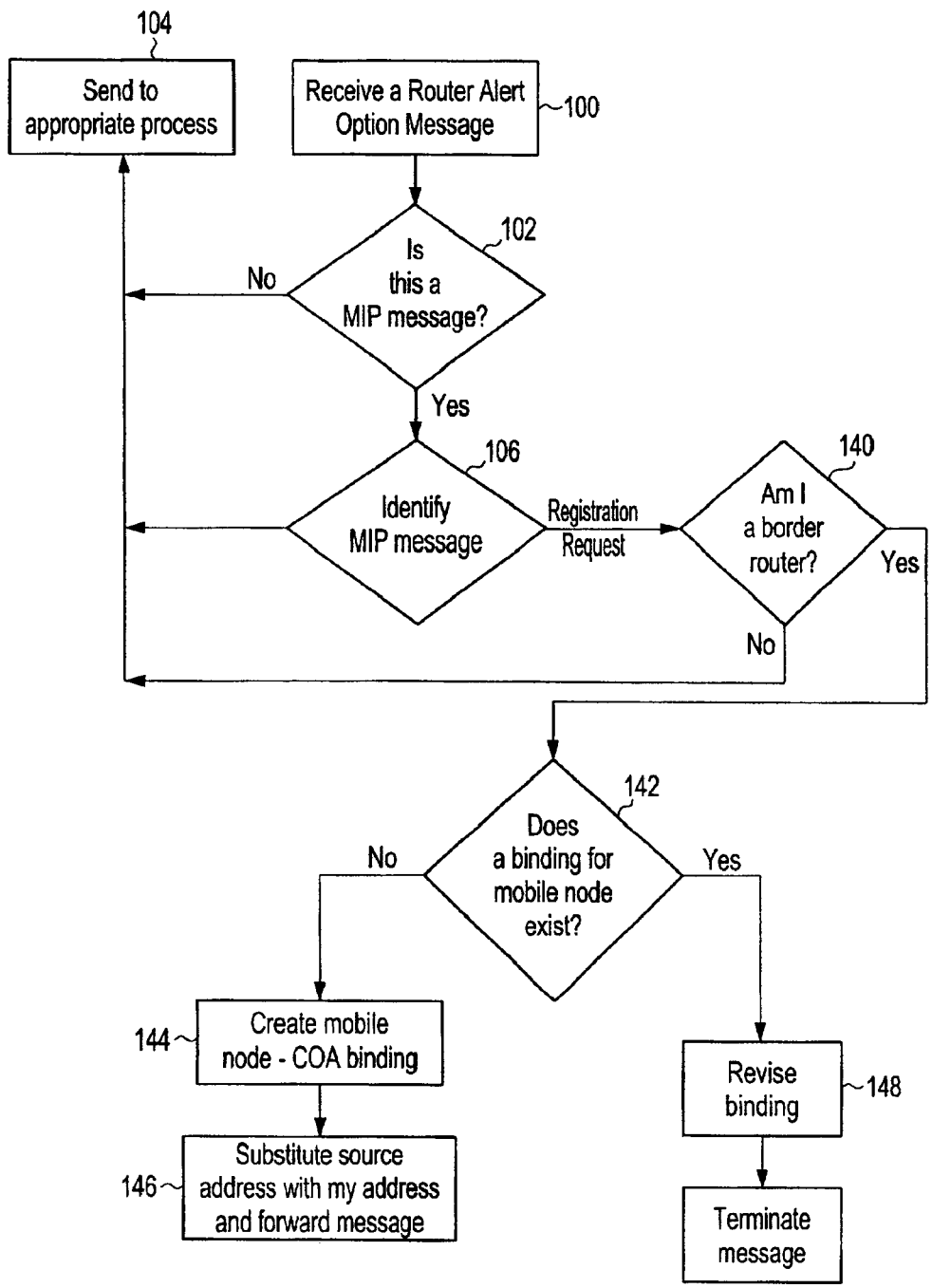
FIG. 5 is a flow chart for handling a Registration Request with Router Alert at a border router.

Referring to FIG. 5, a flow chart for a border router 70 handling a Registration Request message, is shown. A router that is not appropriately programmed to understand the Router Alert messages will merely fail to intercept such messages and handling of the MIP messages will proceed according to conventional methods. If the router is suitably programmed, location update messages with a Router Alert will be identified by the router. For Registration Request messages, if the router is not a border router 70, the message will be passed along through an appropriate process 104. If the router is a border router 70, the message will be examined 140. Decision block 140 can be avoided in a system that accommodates the use of Edge Router Alerts so that only an edge router examines the message. The border router 70 will determine whether the binding for the mobile node identified in the Registration Request already exists 142. In other words, has a tunnel been previously formed through this border router 70 to the mobile node 10? If not, a mobile node to care of address binding is created 144. The border router 70 will modify the Registration Request location update message by substituting its own address for the care of address in the location update 146. The care of address of a mobile node 10 can be a foreign agent 40 or a temporary address the mobile node 10 acquires when it visits a foreign network 45. The modified location update message is forwarded to the home agent 30. Thereafter, messages meant for the mobile node will be sent to the border router 70. The border router 70 having created the binding will send messages meant for the mobile node to its care of address.

If a binding already exists in the border router 70 for the mobile node 10 identified in the Registration Request, that binding will be revised with the new care of address obtained from the Registration Request message 148. Thereafter, the message can be terminated 150. When the home agent 30 has been informed once that the border router 70 serves as the care of address for the mobile node, it need not receive further requests as the mobile node 10 changes location within a domain that passes its Registration Requests through the same border router 70. The border router 70 merely needs to update its binding to maintain communications with the mobile node 10.

Figure 6:
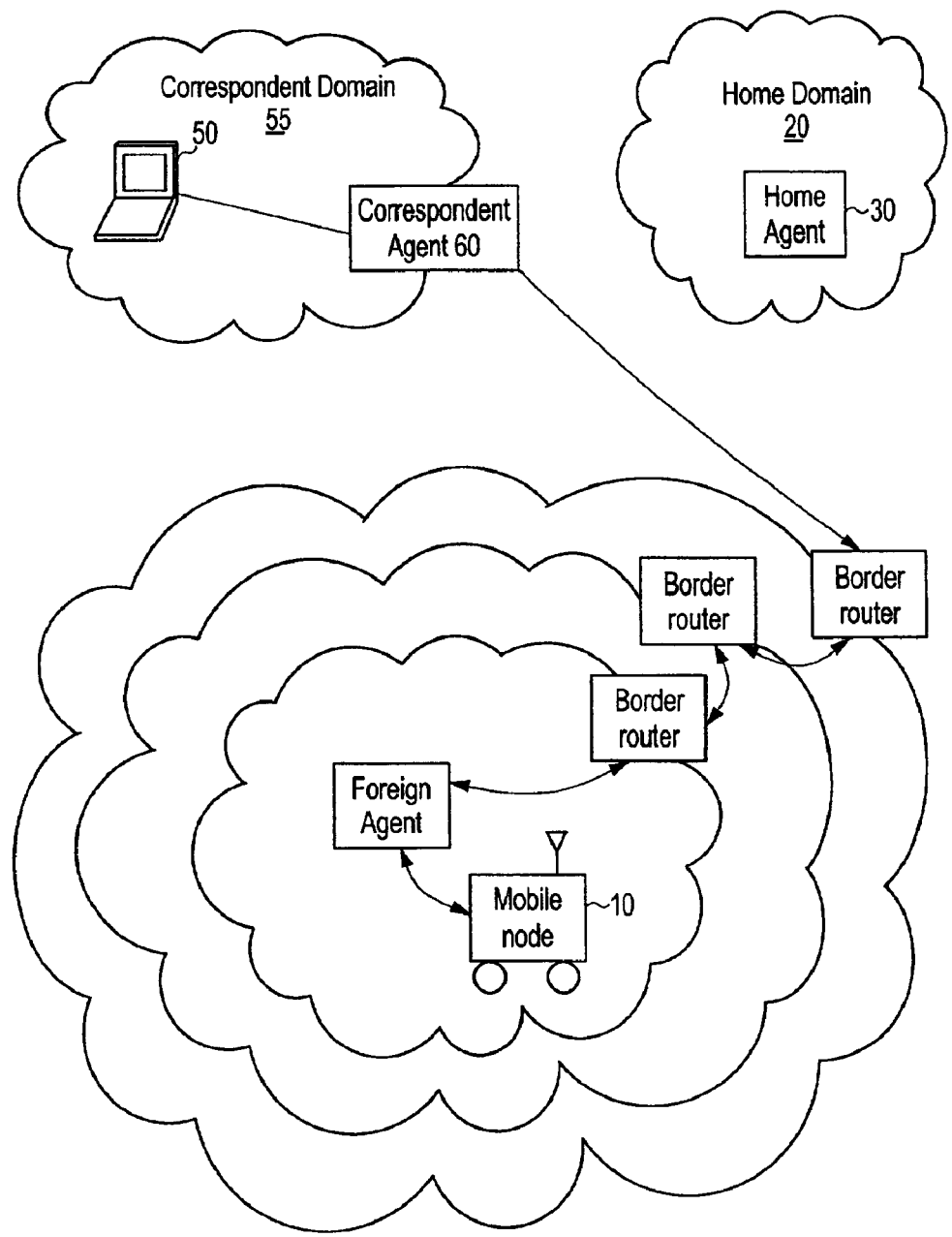
FIG. 6 is a schematic diagram of a network having nested domains each with a border router forming a tunnel endpoint.

After a Registration Request has received a border router's 70 substituted source address and been forwarded along toward the home agent, it is possible for another border router 70 to intercept the Registration Request again en route. If this border router is suitably programmed to intercept location updates, it can substitute its address into the Registration Request 146 and bind the mobile node with the substituted care of address, the address of the previous border router. Tunneling is then nested as shown in FIG. 6. A border router on a domain encompassing the domain of the previous border router can become an additional endpoint along the tunnel. With this arrangement when the mobile node moves outside of the smallest domain but stays within a larger domain, the border router of the larger domain keeps its binding intact. Thus, only a portion of the tunnel needs to be revised. A new Registration Request can be terminated at the border router of the larger domain as a binding already exists for the mobile node.

The embodiments of the invention may advantageously be added to a protocol without the need for updating all routers in the network. Those routers that are suitably programmed to understand the Binding Update or Registration Request messages with Router Alerts will be able to automatically create tunnels. To the extent that such tunnels are not created, communications with the mobile node will continue through those routers that are suitably programmed or, if there are none, then through the home agent.

If MPLS is used in correspondent host's network 55, the functions of correspondent agents 60 can be located in the LERs (Label Edge Routers). LSPs (Label Switched Paths) can be setup the same way as "tunnels" are setup between correspondent agents 60 and foreign agents 40 or intermediate routers at the edge of the MPLS domain. Since an LSP can be setup between a correspondent agent 60 and a foreign agent 50 (the LERs), this allows for traffic aggregation between the LERs.

Preferred embodiments of the invention may be implemented in any conventional computer programming language. For example, preferred embodiments may be implemented in a procedural programming language (e.g., C) or an object oriented programming language (e.g., C++). Alternative embodiments of the invention may be implemented as preprogrammed hardware elements (e.g., application specific integrated circuits and digital signal processors), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a carrier wave medium implemented with wireless techniques (e.g., microwave, infrared, bluetooth or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention are disclosed above, it should be apparent to those skilled in the art that various changes and modifications can be made which will achieve some of the advantages of the invention without departing from the true scope of the invention. These and other obvious modifications are intended to be covered by the claims that follow.

What is claimed is:

1. A method of maintaining communication access to a mobile node comprising:
   intercepting, at a router, a location update message relating to the mobile node; and
   binding an address of the mobile node with a care of address received in the location update message,
   wherein the router is a correspondent agent for a correspondent host and wherein the act of binding forms a tunnel for messages to the mobile node that avoids a home agent of the mobile node.

2. Te method of claim 1 further comprising substituting an address of the router for the care of address in the location update message and forwarding the location update message to a home agent of the mobile node.

3. The method of claim 1 further comprising terminating the location update message.

4. The method of claim 1 wherein the mobile node is a mobile DP host.

5. A method of communicating between the mobile node and the correspondent host according to claim 1 further comprising:
   receiving a data message emanating from the correspondent host; and transmitting the data message toward the mobile node via the tunnel.

6. The method of claim 5 wherein transmitting the data message comprises encapsulating the data message with a header addressed to the care of address.

7. The method of claim 5 wherein the care of address comprises an address unique to the mobile node and transmitting the data message comprises substituting the care of address into the data message.

8. The method of claim 1 wherein the act of binding takes place in a redirector router.

9. The method of claim 8 further comprising commanding the correspondent host to send messages meant for the mobile node to the redirector router.

10. The method of claim 1 wherein the router is an agent for a mobile correspondent host.

11. A method for communicating with a mobile node traveling in a domain remote from its home agent comprising:
    intercepting a location update message from the mobile node at a border router having a binding for the mobile node;
    revising the binding to include a care of address received in the location update message; and
    terminating the location update message.

12. A computer program product for maintaining communication access to a mobile node, the computer program product comprising a computer usable medium having computer program code thereon, said computer program code comprising:
    program code for intercepting a location update message relating to the mobile node; and
    program code for binding an address of the mobile node with a care of address received in the location update message, wherein the program code for binding forms a tunnel for messages to the mobile node that avoids a home agent of the mobile node.

13. The computer program product of claim 12 for use in a router further comprising program code for substituting an address of the router for the care of address in the location update message and forwarding the location update message to a home agent of the mobile node.

14. The computer program product of claim 12 further comprising program code for terminating the location update message.

15. A computer program product for communicating between the mobile node and the correspondent host according to claim 12 further comprising program code for transmitting, in response to receiving a data message emanating from the correspondent host, the data message toward the mobile node via the tunnel.

16. The computer program product of claim 15 wherein the program code for transmitting the data message comprises program code for encapsulating the data message with a header addressed to the care of address.

17. The computer program product of claim 15 wherein the care of address comprises an address unique to the mobile node and the program code for transmitting the data message comprises program code for substituting the care of address into the data message.

18. A computer program product for use in a border router in a domain where a mobile node is remote from the mobile node's home agent, the computer program product comprising a computer usable medium having computer program code thereon, said computer program code comprising:

program code for binding an address of the mobile node with a first care of address;

program code for intercepting a location update message from the mobile node;

program code for revising the binding to replace the first care of address with a second care of address received in the location update message; and program code for terminating the location update message, wherein the router is a correspondent agent for a correspondent host and wherein the act of binding forms a tunnel for messages to the mobile node that avoids a home agent of the mobile node.

* * * * *